United States Patent
Ma et al.

(10) Patent No.: US 12,327,333 B2
(45) Date of Patent: Jun. 10, 2025

(54) IMAGE PROCESSING METHOD AND APPARATUS, AND NON-TRANSITORY COMPUTER READABLE STORAGE MEDIUM

(71) Applicant: GUANGDONG OPPO MOBILE TELECOMMUNICATIONS CORP., LTD., Guangdong (CN)

(72) Inventors: Yuanjiao Ma, Kanagawa (JP); Jun Luo, Kanagawa (JP); Wei Quan, Kanagawa (JP)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 449 days.

(21) Appl. No.: 17/822,322

(22) Filed: Aug. 25, 2022

(65) Prior Publication Data
US 2023/0005116 A1 Jan. 5, 2023

Related U.S. Application Data

(63) Continuation of application No. PCT/CN2020/076670, filed on Feb. 25, 2020.

(51) Int. Cl.
*G06T 5/70* (2024.01)
*G06T 5/50* (2006.01)
(Continued)

(52) U.S. Cl.
CPC ............... *G06T 5/50* (2013.01); *G06T 5/70* (2024.01); *G06T 7/38* (2017.01); *H04N 5/211* (2013.01);
(Continued)

(58) Field of Classification Search
CPC .... G06T 5/50; G06T 5/70; G06T 7/38; G06T 2207/10016; G06T 2207/20221;
(Continued)

(56) References Cited

U.S. PATENT DOCUMENTS 11,310,228 B1 * 4/2022 Rao .................. H04L 67/306

FOREIGN PATENT DOCUMENTS

| CN | 103024248 | 4/2013 |
| CN | 106210448 | 12/2016 |

(Continued)

OTHER PUBLICATIONS

Wang et al., Improved Video Denoising Algorithm Based on Spatial-temporal Combination, IEEE 2013 Seventh International Conference on Image and Graphics (Year: 2013).*

(Continued)

*Primary Examiner* — Said M Elnoubi
(74) *Attorney, Agent, or Firm* — Hodgson Russ LLP

(57) ABSTRACT

An image processing method and apparatus, and a non-transitory computer-readable storage medium are provided. The method includes: acquiring an exposure duration and at least one motion component corresponding to at least one direction within the exposure duration of a current video frame; performing a first noise reduction operation on the current video frame in a two-dimensional space domain in response to a first motion component of the at least one motion component being greater than a preset motion component threshold; and performing a second noise reduction operation on the current video frame in a three-dimensional space domain in response to the at least one motion component being less than the preset motion component threshold.

20 Claims, 6 Drawing Sheets

(51) Int. Cl.
  *G06T 7/38* (2017.01)
  *H04N 5/21* (2006.01)

(52) U.S. Cl.
  CPC ............... *G06T 2207/10016* (2013.01); *G06T 2207/20221* (2013.01)

(58) Field of Classification Search
  CPC .......... G06T 2207/20182; H04N 5/211; H04N 5/144; H04N 5/21
  See application file for complete search history.

(56) References Cited

FOREIGN PATENT DOCUMENTS

| CN | 107438146 |   | 12/2017 |
| CN | 107438146 | A * | 12/2017 |
| CN | 109859126 |   | 6/2019 |
| CN | 109889695 |   | 6/2019 |
| JP | 2007129310 | A * | 5/2007 |

OTHER PUBLICATIONS

EPO, Extended European Search Report for EP Application No. 20922297.5, Mar. 21, 2023.
Wang et al., "Improved Video Denoising Algorithm Based on Spatial-temporal Combination," Seventh International Conference on Image and Graphics, 2013.
"Vibrating structure gyroscope," Wikipedia, retrieved from the internet: <https://en.wikipedia.org/w/index.php?title=Vibrating_structure_gyroscope&oldid=748809391>, 2016.
WIPO, International Search Report and Written Opinion for PCT/CN2020/076670, Nov. 26, 2020.
EPO, Communication for EP Application No. 20922297.5, Jan. 27, 2025).

\* cited by examiner

The shooting device has a small
motion amplitude when shooting
current video frame Shot current
video frame The shooting device has a large
motion amplitude when shooting
current video frame Shot current
video frame

IMAGE PROCESSING METHOD AND APPARATUS, AND NON-TRANSITORY COMPUTER READABLE STORAGE MEDIUM

CROSS REFERENCE TO RELATED APPLICATIONS

This application is a continuation of International Patent Application No. PCT/CN2020/076670, filed Feb. 25, 2020, the entire disclosure of which is incorporated herein by reference.

TECHNICAL FIELD

Embodiments of the present disclosure relate to the technical field of image processing, and more specifically, to an image processing method, an image processing apparatus, and a non-transitory computer-readable storage medium.

BACKGROUND

At present, in order to reduce a noise in a video and improve an image display effect of the video, multi-frame noise reduction algorithm is used to reduce the noise of a video frame of the video. Specifically, a frame alignment is performed on a denoised previous video frame and a current video frame having noise, and then a fusion operation is performed on aligned video frames to achieve the multi-frame noise reduction for the video frames.

However, an effect of a multi-frame alignment is poor when the mobile phone is moving fast, thereby leading to an unsatisfactory effect of the multi-frame noise reduction. Generally, an alignment accuracy between two frames is increased by adding algorithms. However, adding the algorithms will lead to a long time of image processing and a low speed of image processing.

SUMMARY

Embodiments of the present disclosure provide an image processing method, an image processing apparatus, and a non-transitory computer-readable storage medium.

Technical solutions in some embodiments of the present disclosure are achieved below.

An image processing method is provided in some embodiments of the present disclosure, the method includes: acquiring an exposure duration of a current video frame and at least one motion component corresponding to at least one direction within the exposure duration; performing a first noise reduction operation on the current video frame in a two-dimensional space domain in response to a first motion component of the at least one motion component being greater than a preset motion component threshold; and performing a second noise reduction operation on the current video frame in a three-dimensional space domain in response to the at least one motion component being less than the preset motion component threshold.

An image processing apparatus is further provided in some embodiments of the present disclosure. The image processing apparatus includes: a processor, a memory storing instructions executable by the processor, a communication interface, and a bus configured to connect the processor, the memory, and the communication interface. When the instructions are executed, the processor performs above method, and the method comprises: acquiring an exposure duration of a current video frame and at least one motion component corresponding to at least one direction within the exposure duration; performing a first noise reduction operation on the current video frame in a two-dimensional space domain in response to a first motion component of the at least one motion component being greater than a preset motion component threshold; and performing a second noise reduction operation on the current video frame in a three-dimensional space domain in response to the at least one motion component being less than the preset motion component threshold.

A non-transitory computer-readable storage medium is provided in some embodiments of the present disclosure. The non-transitory computer-readable storage medium stores a program applied to an image processing apparatus, and the program is executed by a processor to implement above method, and the method comprises: acquiring an exposure duration of a current video frame and at least one motion component corresponding to at least one direction within the exposure duration; performing a first noise reduction operation on the current video frame in a two-dimensional space domain in response to a first motion component of the at least one motion component being greater than a preset motion component threshold; and performing a second noise reduction operation on the current video frame in a three-dimensional space domain in response to the at least one motion component being less than the preset motion component threshold.

BRIEF DESCRIPTION OF THE DRAWINGS

FIG. 1 (b) is a schematic diagram illustrating a current video frame shot by the shooting device in the related art when the shooting device is moving quickly.

DETAILED DESCRIPTION

Figure 1:
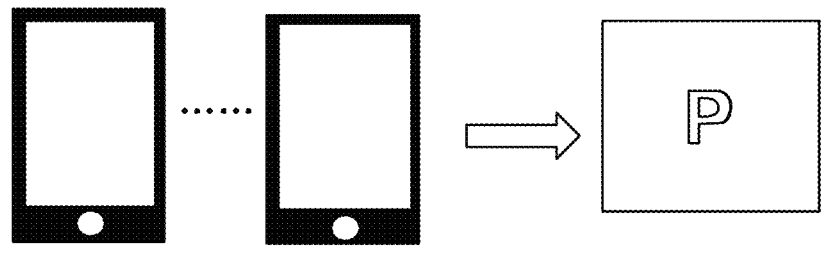
FIG. 1 (a) is a schematic diagram illustrating a current video frame shot by a shooting device in the related art when the shooting device is moving by a small distance.
Figure 1:
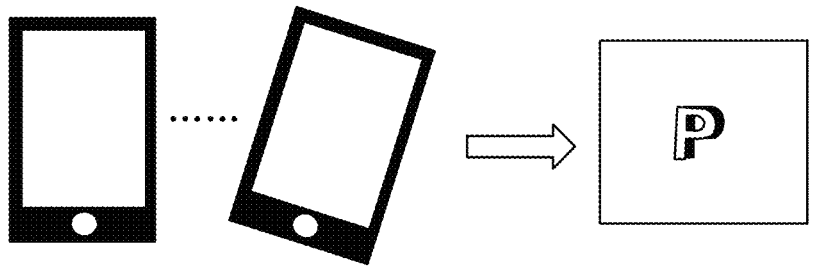

The technical solutions in some embodiments of the present disclosure will be clearly and completely described below in conjunction with drawings in the embodiments of the present disclosure. It should be understood that the embodiments described here are only used to explain the related disclosure, but not to limit the disclosure. In addition, it should be noted that, for ease of description, only parts related to the present disclosure are shown in the drawings.

When a still photo is shot or a shooting device is fixed, a mobile phone can be kept as still as possible since a shooting time is short. Thus, in this case, a camera may be moved by a small distance, and less serious "ghost" may be generated in multi-frame noise reduction fusion. As shown in FIG. 1 (a), the shooting device is moving by a small distance or having a small motion amplitude when shooting or capturing a current video frame, in this case, the current video frame captured may have less "ghost". Herein, the terms "motion amplitude" of a device means the moving degree (distance and/or angle) of the device. As shown in FIG. 1(b), in case that a user is holding the shooting device to shoot a video such that it is difficult for the user to maintain a posture within dozens of seconds, or in case that the user enormously and dynamically moves the shooting device to capture various dynamic scenes, motion vectors of a previous frame and a next frame may vary greatly, such that the alignment accuracy is insufficient, thereby generating serious "ghost" during a synthesis of last two frames. In addition, a video frame having the "ghost" will continue to be used for a synthesis of a next video frame, such that the "ghost" will be present in all subsequent video frames, which affects an effect of the noise reduction of the video. In order to solve above problems, technical solutions of the present disclosure may be provided.

The technical solutions in the embodiments of the present disclosure will be clearly and completely described below in conjunction with the drawings in the embodiments of the present disclosure.

Figure 2:
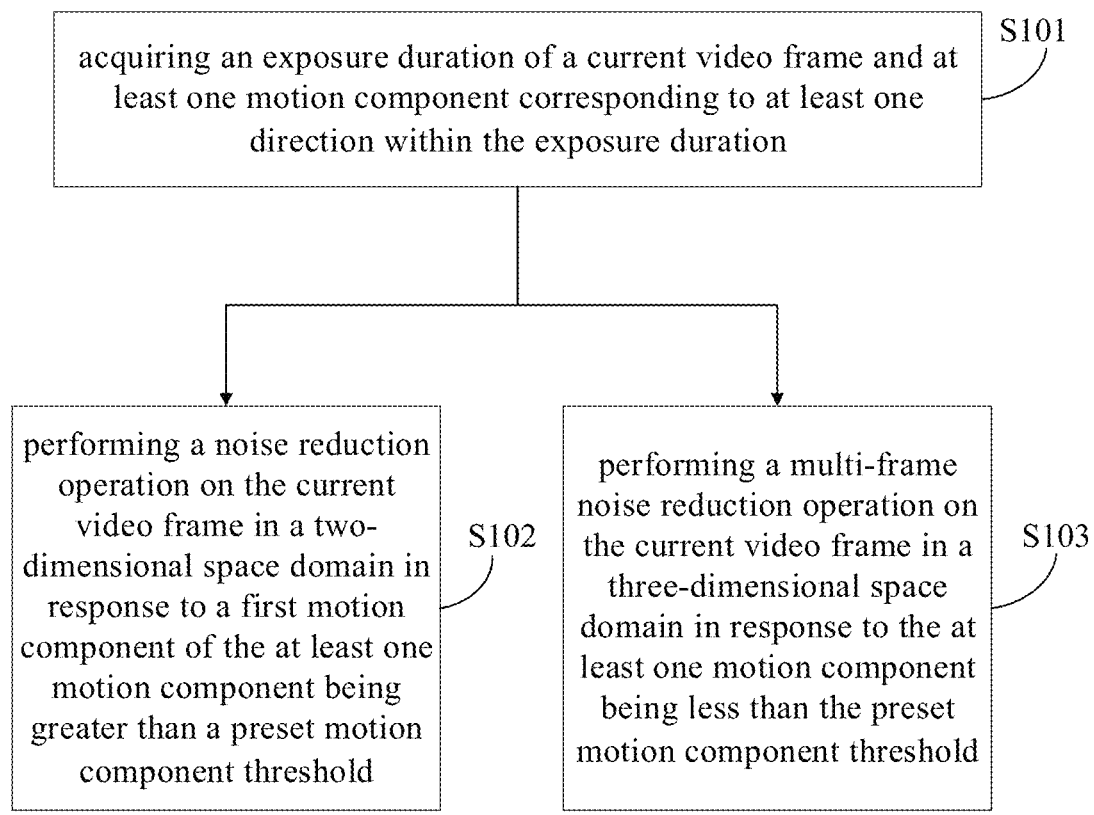
FIG. 2 is a flowchart of an image processing method according to some embodiments of the present disclosure.

In some embodiments of the present disclosure, an image processing method may be provided. FIG. 2 is a flowchart of the image processing method according to some embodiments of the present disclosure. The method may include following operations.

In operation S101, an exposure duration of a current video frame and at least one motion component corresponding to at least one direction within the exposure duration may be acquired.

The image processing method provided in some embodiments of the present disclosure is applicable to a scene where a multi-frame noise reduction operation is performed for video frames in an acquired or captured video.

In some embodiments, an image processing apparatus may be any apparatus with image acquisition and image processing functions, such as a tablet computer, a mobile phone, a personal computer (PC), a notebook computer, a camera, a network TV, a wearable apparatus, and so on.

In some embodiments, the image processing apparatus may acquire the exposure duration of the current video frame in response to the image processing apparatus receiving the current video frame to be processed. Specifically, the image processing apparatus may acquire a Start of Frame (SOF) Timestamp and an End of Frame (EOF) Timestamp from a metadata of the current video frame. After that, the image processing apparatus may determine a duration between the EOF and the SOF as the exposure duration of the current video frame.

In some embodiments, the image processing apparatus may acquire at least one motion component of the image processing apparatus in or corresponding to at least one direction within the exposure duration. The motion component may be an angular velocity component or an acceleration component, etc., which may be specifically selected according to actual conditions, and which may not be specifically limited in some embodiments of the present disclosure.

In some embodiments, the image processing apparatus may include an angular velocity sensor. The image processing apparatus may acquire an angular velocity component in at least one dimension from the angular velocity sensor within the exposure duration. The image processing apparatus may determine the angular velocity component in the at least one dimension to be the at least one motion component corresponding to the at least one direction. Specifically, the image processing apparatus may divide the exposure duration into a set of time samples. The image processing apparatus may acquire at least one set of angular-velocity-component samples in the least one dimension within or during the set of time samples from the angular velocity sensor, and each of the at least one dimension corresponds to one of the at least one set of angular-velocity-component samples within or during the set of time samples. Then, the image processing apparatus may determine the angular velocity component in the at least one dimension within the exposure duration according to or based on the at least one set of angular-velocity-component samples, and determine the angular velocity component in the at least one dimension as the at least one motion component corresponding to the at least one direction.

In some embodiments, the angular velocity sensor may be a device configured to perform an angular velocity measurement, such as a gyroscope. The number of the gyroscopes may be determined according to the at least one dimension acquired based on actual needs, which is not specifically limited in some embodiments of the present disclosure.

In some embodiments, the angular velocity component in the at least one dimension may be a two-dimensional angular velocity component or a three-dimensional angular velocity component, etc., which may be specifically selected according to actual conditions, and which may not be specifically limited in some embodiments of the present disclosure. Taking the three-dimensional angular velocity component as an example, the image processing apparatus may use the gyroscope to collect an X-axis angular velocity component, a Y-axis angular velocity component, and a Z-axis angular velocity component within the exposure duration.

It should be noted that, the angular velocity component in the at least one dimension is configured to represent or indicate whether the image processing apparatus is moving quickly. Therefore, in response to the image processing apparatus acquiring the angular velocity component in the at least one dimension within the exposure duration, the image processing apparatus may determine a degree of motion or the motion amplitude thereof based on an integral of an absolute value of the angular velocity component within the exposure duration without needing to consider a specific direction of motion.

Figure 3:
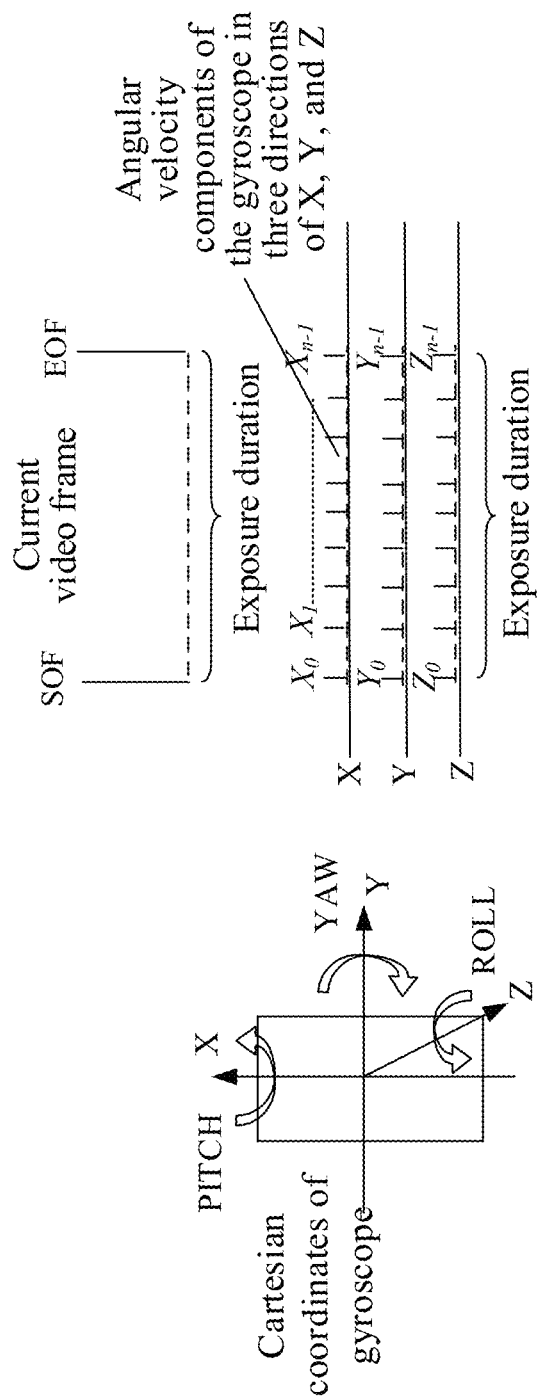
FIG. 3 is a schematic diagram illustrating an exemplary image processing device acquiring angular velocity components of a gyroscope in three directions of X, Y, and Z according to some embodiments of the present disclosure.

Exemplarily, as shown in FIG. 3, the image processing apparatus may determine the duration between the SOF Timestamp and the EOF Timestamp as the exposure duration. The image processing apparatus may divide the exposure duration into N time samples, and acquire angular velocity components of the gyroscope in three directions of X, Y, and Z during each time sample of the N time samples. The gyroscope may be configured to calibrate angles in the three directions of X, Y, and Z through Cartesian coordinates. In this way, the image processing apparatus may acquire a set of angular velocity components $X_0, X_1, \ldots X_N$ of the gyroscope in the X axis within the exposure duration.

The image processing apparatus may determine the angular velocity component of the image processing apparatus in the X axis by using the set of angular velocity components $X_0$, $X_1, \ldots, X_N$, which is specifically shown in formula (1).

$$\text{angular velocity component of } X \text{ axis} = \sum_{N=0}^{N=n-1} |X_N| \quad (1)$$

The image processing apparatus may acquire a set of angular velocity components $Y_0, Y_1, \ldots, Y_N$ of the gyroscope in the Y axis within the exposure duration. The image processing apparatus may determine the angular velocity component of the image processing apparatus in the Y axis through or by using the set of angular velocity components $Y_0, Y_1, \ldots, Y_N$, which is specifically shown in formula (2).

$$\text{angular velocity component of } Y \text{ axis} = \sum_{N=0}^{N=n-1} |Y_N| \quad (2)$$

The image processing apparatus may acquire a set of angular velocity components $Z_0, Z_1, \ldots, Z_N$ of the gyroscope in the Z axis within the exposure duration. The image processing apparatus may determine the angular velocity component of the image processing apparatus in the Z axis through or by using the set of angular velocity components $Z_0, Z_1, \ldots, Z_N$, which is specifically shown in formula (3).

$$\text{angular velocity component of } Z \text{ axis} = \sum_{N=0}^{N=n-1} |Z_N| \quad (3)$$

In operation S102, in response to a first motion component of the at least one motion component being greater than a preset motion component threshold, a first noise reduction operation may be performed on the current video frame in a two-dimensional space domain. The first noise reduction operation may be an intraframe noise reduction operation performed on the current video frame without using a previous video frame prior to the current video frame and a next video frame next to the current video frame.

After the image processing apparatus acquires the exposure duration and the at least one motion component corresponding to the at least one direction within the exposure duration, the image processing apparatus may compare the at least one motion component with the preset motion component threshold. In response to the first motion component of the at least one motion component being greater than the preset motion component threshold, the image processing apparatus may perform the first noise reduction operation on the current video frame in the two-dimensional space domain.

In some embodiments, the image processing apparatus may be preset with the preset motion component threshold, and the image processing apparatus may compare the at least one motion component with the preset motion component threshold. In response to the first motion component threshold greater than the preset motion component threshold existing in the at least one motion component, it indicates that the motion amplitude of the image processing apparatus is too great or overlarge when the image processing apparatus is capturing the current video frame. In this case, the image processing apparatus may perform the first noise reduction operation on the current video frame in the two-dimensional space domain, and prohibit or disable the current video frame from being fused with an adjacent historical video frame and an adjacent next video frame. It should be noted that the adjacent historical video frame is the previous video frame prior to the current video frame, and the adjacent next video frame is next to the current video frame.

In some embodiments, the image processing apparatus may perform the first noise reduction operation on the current video frame in the two-dimensional space domain through noise reduction methods, such as Gaussian filter, Bilateral filter, or the like.

In some embodiments, in response to the image processing apparatus determining that the first motion component is greater than the preset motion component threshold, in order to improve an accuracy of detecting the motion of the image processing apparatus, the image processing apparatus may further acquire at least one motion radian corresponding to the at least one direction within the exposure duration, and compare the at least one motion radian with a preset radian threshold. In response to the image processing apparatus determining that a first motion radian of the at least one motion radian is greater than the preset radian threshold, the image processing apparatus may perform the first noise reduction operation on the current video frame in the two-dimensional space domain.

Figure 4:
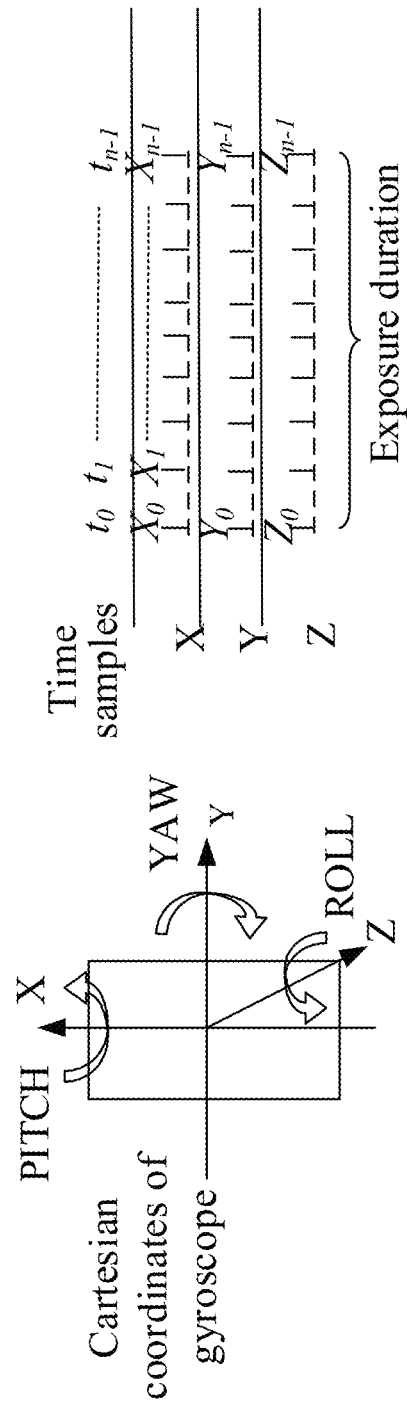
FIG. 4 is a schematic diagram of an exemplary image processing device acquiring motion radians of the gyroscope in the three directions of X, Y, and Z according to some embodiments of the present disclosure.

Exemplarily, as shown in FIG. 4, the image processing apparatus may acquire angular velocity components of the gyroscope in the three directions along the X axis, Y axis, and Z axis during N time samples. Then, the image processing apparatus may acquire a set of angular velocity components $X_0, X_1, \ldots, X_N$ of the gyroscope in or along the X axis within or during time samples $t_0, t_1, \ldots, t_N$. The image processing apparatus may determine the motion radian of the image processing apparatus along the X axis by using the set of angular velocity components $X_0, X_1, \ldots, X_N$, which is specifically shown in formula (4).

$$\text{motion radian of } X \text{ axis} = \sum_{N=1}^{N=n-1} |X_N| \times (t_N - t_{N-1}) \quad (4)$$

The image processing apparatus may acquire a set of angular velocity components $Y_0, Y_1, \ldots, Y_N$ of the gyroscope along the Y axis during time samples $t_0, t_1, \ldots, t_N$. The image processing apparatus may determine the motion radian of the image processing apparatus along the Y axis by using the set of angular velocity components $Y_0, Y_1, \ldots, Y_N$, which is specifically shown in formula (5).

$$\text{motion radian of } Y \text{ axis} = \sum_{N=1}^{N=n-1} |Y_N| \times (t_N - t_{N-1}) \quad (5)$$

The image processing apparatus may acquire a set of angular velocity components $Z_0, Z_1, \ldots, Z_N$ of the gyroscope along the Z axis during time samples $t_0, t_1, \ldots, t_N$. The image processing apparatus may determine the motion radian of the image processing apparatus along the Z axis by using the set of angular velocity components $Z_0, Z_1, \ldots, Z_N$, which is specifically shown in formula (6).

$$\text{motion radian of } Z \text{ axis} = \sum_{N=1}^{N=n-1} |Z_N| \times (t_N - t_{N-1}) \quad (6)$$

In operation S103, in response to the at least one motion component being less than the preset motion component threshold, a multi-frame noise reduction operation may be performed on the current video frame in a three-dimensional space domain. Herein, the multi-frame noise reduction operation may also be referred as a second noise reduction operation in the following, and the multi-frame noise reduction operation may be an interframe noise reduction operation during which the current video frame may be fused with the previous video frame and the next video frame.

After the image processing apparatus acquires the exposure duration and the at least one motion component corresponding to the at least one direction within the exposure duration of the current video frame, the image processing apparatus may compare the at least one motion component with the preset motion component threshold. In response to the image processing apparatus determining that all of the at least one motion component is less than the preset motion component threshold, the image processing apparatus may perform the multi-frame noise reduction operation on the current video frame in the three-dimensional space domain.

Exemplarily, the image processing apparatus may acquire the motion components in the X, Y, and Z three directions of the gyroscope within the exposure duration, and compare the motion components in the X, Y, and Z directions with the preset motion component threshold. In response to the motion components in the X, Y, and Z three directions being all less than the preset motion component threshold, it indicates that the motion amplitude of the image processing apparatus satisfies a condition of the multi-frame noise reduction operation when the image processing apparatus is collecting the current video frame. In this case, the image processing apparatus may perform the multi-frame noise reduction operation on the current video frame in the three-dimensional space domain.

In some embodiments, in order to improve the accuracy of detecting the motion of the image processing apparatus, the image processing apparatus may further acquire the at least one motion radian corresponding to the at least one direction within the exposure duration, and compare the at least one motion radian with the preset radian threshold. In response to the image processing apparatus determining that the first motion radian of the at least one motion radian is less than the preset radian threshold, the image processing apparatus may align the current video frame with the adjacent historical video frame and the adjacent next video frame, thereby performing the multi-frame noise reduction operation on the current video frame.

Figure 5:
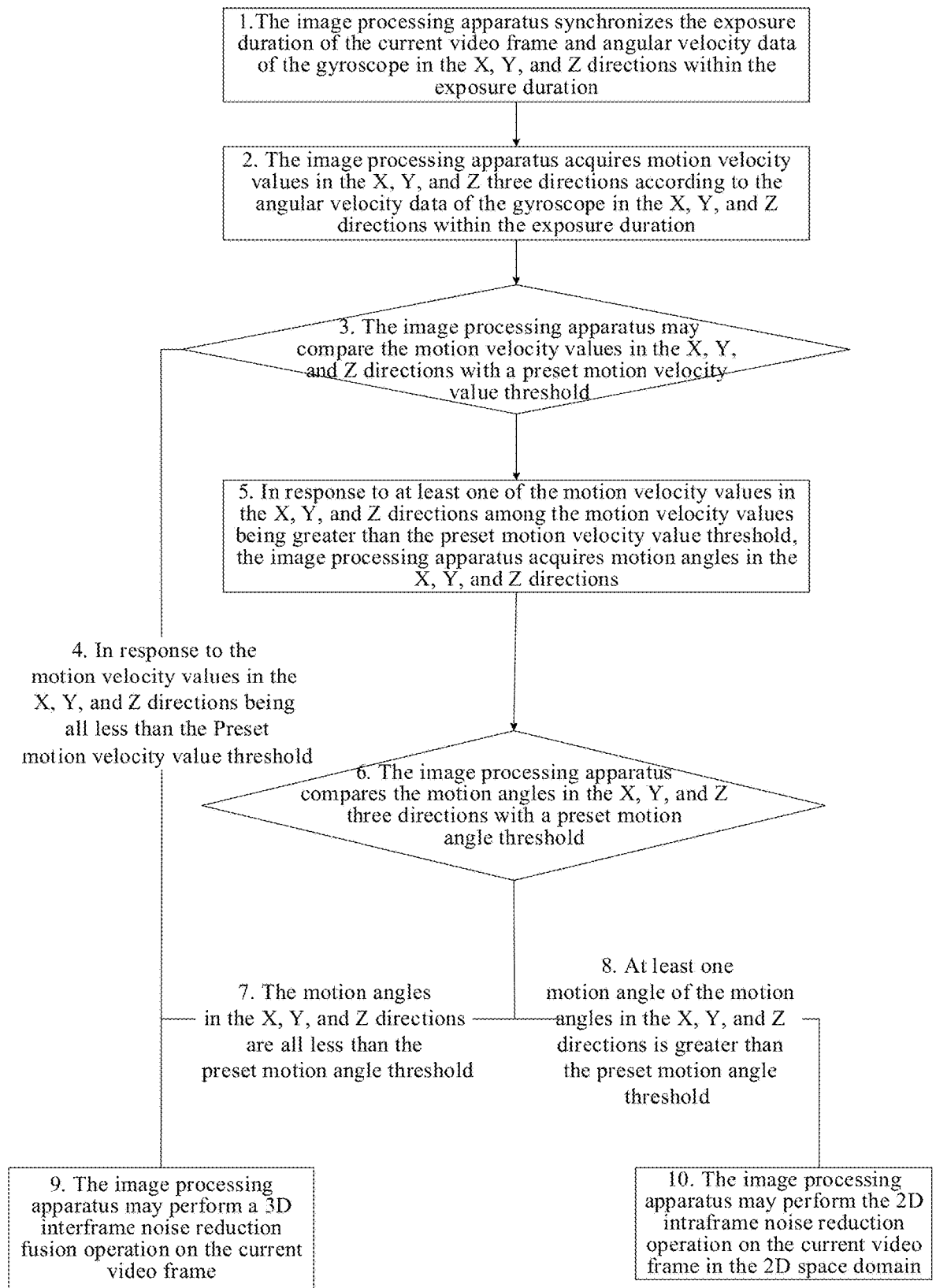
FIG. 5 is a schematic flowchart of an exemplary image processing method according to some embodiments of the present disclosure.

Exemplarily, as shown in FIG. 5, the flow chart for the image processing apparatus to determine whether to perform the first noise reduction operation in the two-dimensional space domain on the current frame according to the motion amplitude of the image processing apparatus within the exposure duration is described below.

1. The image processing apparatus may synchronize the exposure duration of the current video frame and angular velocity data of the gyroscope in the X, Y, and Z directions within the exposure duration. The X direction is substantially perpendicular to the Y direction and the Z direction, and the Y direction is substantially perpendicular to the Z direction.

2. The image processing apparatus may acquire motion velocity values in the X, Y, and Z three directions according to the angular velocity data of the gyroscope in the X, Y, and Z directions within the exposure duration.

3. The image processing apparatus may compare the motion velocity values in the X, Y, and Z directions with a preset motion velocity value threshold.

4. In response to the motion velocity values in the X, Y, and Z directions being all less than the preset motion velocity value threshold, an operation 9 may be executed.

5. In response to at least one of the motion velocity values in the X, Y, and Z directions among the motion velocity values being greater than the preset motion velocity value threshold, the image processing apparatus may acquire motion angles in the X, Y, and Z directions.

6. The image processing apparatus may compare the motion angles in the X, Y, and Z three directions with a preset motion angle threshold.

7. In response to the motion angles in the X, Y, and Z directions being all less than the preset motion angle threshold, the operation 9 may be executed.

8. In response to at least one motion angle of the motion angles in the X, Y, and Z directions being greater than the preset motion angle threshold, an operation 10 may be executed.

9. The image processing apparatus may perform a 3D interframe noise reduction fusion operation on the current video frame, the adjacent previous video frame prior to the current video frame, and the adjacent next video frame next to the current video frame. That is to say, the current video frame may be fused with the adjacent previous video frame, and further fused with the adjacent next video frame.

10. The image processing apparatus may perform the 2D intraframe noise reduction operation on the current video frame in the 2D space domain.

Figure 6:
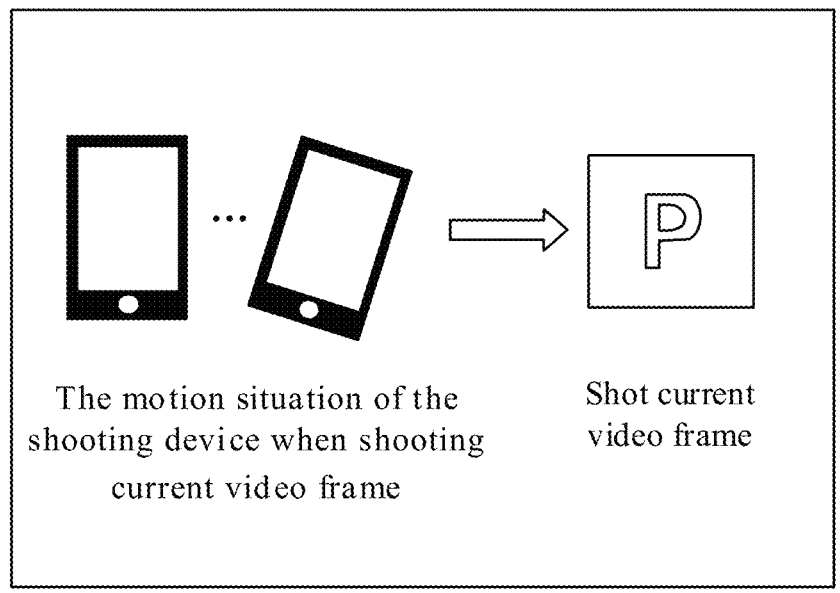
FIG. 6 is a displayed diagram illustrating that no "ghost" exists in the current video frame shot by a shooting device according to some embodiments of the present disclosure when the shooting device is moved quickly.

It can be understood that, when the image processing apparatus is performing the noise reduction on the current video frame, the image processing apparatus may first acquire the at least one motion component in the at least one direction of the image processing apparatus within the exposure duration of the current video frame, and then determine the motion component of the image processing apparatus based on the at least one motion component within the exposure duration. In response to the at least one motion component of the image processing apparatus within the exposure duration being greater than the preset motion component threshold, the image processing apparatus may directly perform the first noise reduction operation on the current video frame in the two-dimensional space domain to reduce the operations for processing the alignment accuracy of multiple frames, thereby shortening the time duration of an image processing, and improving the speed of the image processing. In some embodiments, as shown in FIG. 6, when the image processing apparatus is moving quickly, the image processing apparatus may only perform the 2D noise reduction operation on the current video frame, and may not perform the fusion of the previous frame and the next frame, thereby reducing the occurrence of the "ghost".

Figure 7:
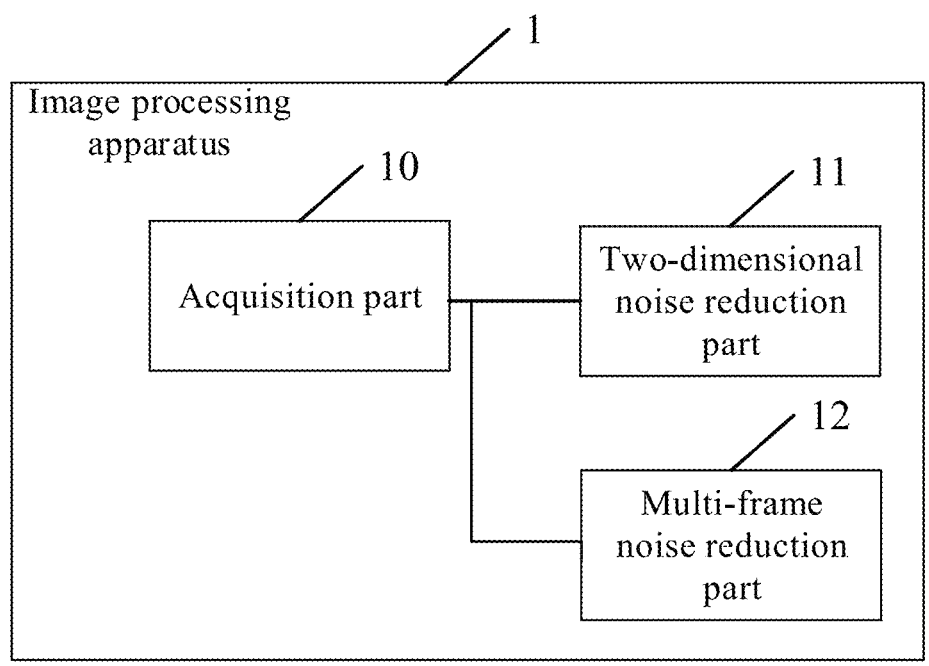
FIG. 7 is a first structural block diagram of an image processing apparatus according to some embodiments of the present disclosure.

Based on above-mentioned embodiments, in some other embodiments of the present disclosure, FIG. 7 is a first schematic diagram of a configuration structure of the image processing apparatus according to some embodiments of the present disclosure. As shown in FIG. 7, the image processing apparatus 1 according to some embodiments of the present disclosure may include an acquisition part 10, a two-dimensional noise reduction part 11, and a multi-frame noise reduction part 12.

The acquisition part 10 is configured to acquire an exposure duration of a current video frame and at least one motion component corresponding to at least one direction within the exposure duration.

The two-dimensional noise reduction part 11 is configured to perform a first noise reduction operation on the current video frame in a two-dimensional space domain in response to a first motion component of the at least one motion component being greater than a preset motion component threshold.

The multi-frame noise reduction part 12 is configured to perform a multi-frame noise reduction operation on the current video frame in a three-dimensional space domain in response to the at least one motion component being less than the preset motion component threshold.

Further, the image processing apparatus 1 includes a calculation part.

The calculation part is configured to acquire at least one motion radian corresponding to the at least one direction within the exposure duration in response to the first motion component being greater than the preset motion component threshold.

The two-dimensional noise reduction part 11 is further configured to perform the first noise reduction operation on the current video frame in the two-dimensional space domain in response to a first motion radian of the at least one motion radian being greater than a preset radian threshold.

Further, the image processing apparatus includes an angular velocity sensor. The image processing apparatus further includes a division part and a determination part.

The division part is configured to divide the exposure duration into a set of time samples.

The acquisition part 10 is configured to acquire at least one set of angular-velocity-component samples in at least one dimension during the set of time samples from the angular velocity sensor, and each of the at least one dimension corresponds to one of the at least one set of angular-velocity-component samples during the set of time samples.

The determination part is configured to determine an angular velocity component in the at least one dimension within the exposure duration based on the at least one set of angular-velocity-component samples. The determination part is also configured to determine the angular velocity component in the at least one dimension as the at least one motion component corresponding to the at least one direction.

Further, the image processing apparatus includes a prohibition part.

The prohibition part is configured to prohibit or disable the current video frame from being fused with an adjacent historical video frame and an adjacent next video frame in response to the at least one motion component being greater than the preset motion component threshold and/or the at least one motion radian being greater than the preset radian threshold. In other words, the prohibition part may be configured to prohibit the current video frame from being fused with an adjacent historical video frame and an adjacent next video frame in response to satisfying at least one following condition: the at least one motion component is greater than the preset motion component threshold, and the at least one motion radian being greater than the preset radian threshold. It should be noted that, the term "A and/or B" includes A existing alone, B existing alone, and A and B existing simultaneously.

Further, the multi-frame noise reduction part 12 is configured to perform the multi-frame noise reduction operation on the current video frame by performing the multi-frame alignment on the current video frame with the adjacent historical video frame and the adjacent next video frame in response to the first motion component being less than the preset motion component threshold and/or the first motion radian being less than the preset radian threshold.

Figure 8:
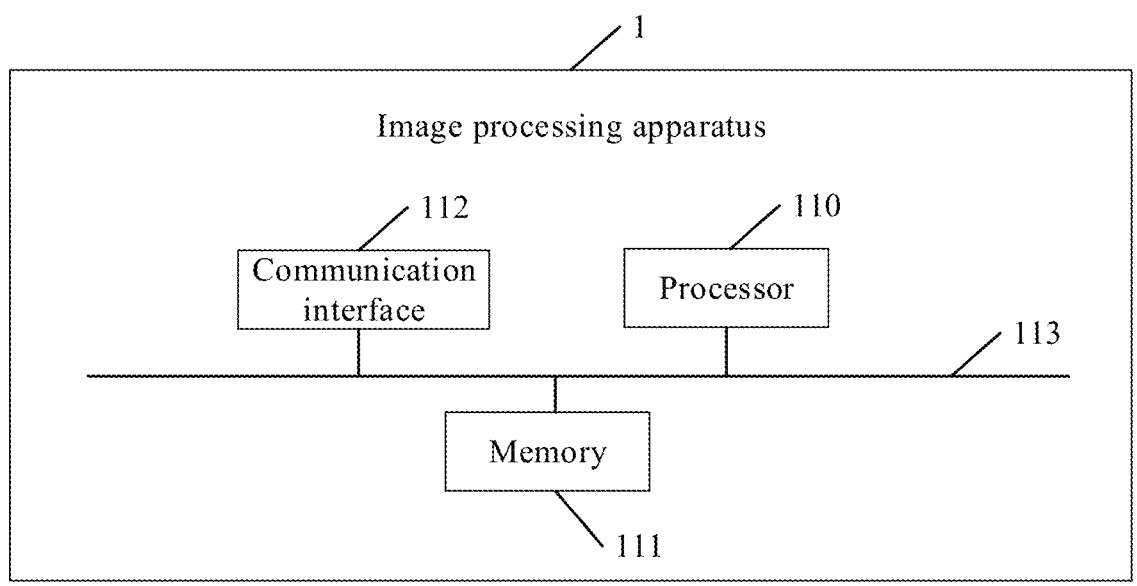
FIG. 8 is a second structural block diagram of an image processing apparatus according to some embodiments of the present disclosure.

FIG. 8 is a second schematic diagram of the composition structure of the image processing apparatus according to some embodiments of the disclosure. As shown in FIG. 8, the image processing apparatus 1 may further include a processor 110, a memory 111 storing instructions executable by the processor 110, a communication interface 112, and a bus 113 configured to connect the processor 110, the memory 111, and the communication interface 112.

In some embodiments of the present disclosure, the processor 110 may be at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a controller, a microcontroller, and a microprocessor. It should be understood that, for different devices, electronic components configured to implement the above-mentioned functions of the processor may also be other electronic components, which is not specifically limited in some embodiments of the present disclosure. The image processing apparatus 1 may also include the memory 111 connected to the processor 110, and the memory 111 is configured to store executable program codes including computer operation instructions. The memory 111 may include a high-speed Random Access Memory (RAM) or a non-volatile memory, for example, at least two disk memories.

In some embodiments, the bus 113 is configured to connect the communication interface 112, the processor 110, and the memory 111. The bus 113 is also configured to achieve the communication among these components.

In some embodiments, the memory 111 is configured to store the instructions and data.

Further, in some embodiments, the processor 110 is configured to acquire the exposure duration of the current video frame and the at least one motion component corresponding to the at least one direction within the exposure duration. In response to the first motion component of the at least one motion component being greater than the preset motion component threshold, the processor 110 is configured to perform the first noise reduction operation on the current video frame in the two-dimensional space domain. In response to the at least one motion component being less than the preset motion component threshold, the processor 110 is configured to perform the multi-frame noise reduction operation on the current video frame in the three-dimensional space domain.

Further, in some embodiments, the processor 110 is configured to acquire the at least one motion radian corresponding to the at least one direction within the exposure duration in response to the first motion component being greater than the preset motion component threshold. In response to the first motion radian of the at least one motion radian being greater than a preset radian threshold, the processor 110 is configured to perform the first noise reduction operation on the current video frame in the two-dimensional space domain.

Further, in some embodiments, the processor 110 is configured to acquire the angular velocity component in at least one dimension within the exposure duration from the angular velocity sensor. The processor 110 is configured to determine the angular velocity component in the at least one dimension as the at least one motion component corresponding to the at least one direction.

Further, in some embodiments, the processor 110 is configured to prohibit or disable the current video frame from being fused with the adjacent historical video frame and the adjacent next video frame in response to the at least one motion component being greater than the preset motion component threshold and/or the at least one motion radian being greater than the preset radian threshold.

Further, in some embodiments, the processor 110 is configured to perform the multi-frame noise reduction operation on the current video frame by performing the multi-frame alignment on the current video frame with the adjacent historical video frame and the adjacent next video frame in response to the first motion component being less than the preset motion component threshold and/or the first motion radian being less than the preset radian threshold.

In practical applications, the memory 111 may be a volatile memory, such as a Random-Access Memory (RAM). The memory 111 may also be a non-volatile memory, such as a Read-Only Memory (ROM), a flash memory, a Hard Disk Drive (HDD), a Solid-State Drive (SSD). Or, the memory 111 may be a combination of the above-mentioned types of memories, and the memory 111 may be configured to provide instructions and data to the processor 110.

In addition, in some embodiments of the present disclosure, all function modules may be integrated into one processing unit. Alternatively, each unit may exist alone physically, or two or more units may be integrated into one unit. The above-mentioned integrated unit may be implemented in form of a hardware or a software function module.

When the integrated unit is implemented in form of the software function module and is not sold or used as an independent product, the integrated unit may be stored in a non-transitory computer-readable storage medium. In this way, the technical solution of some embodiments may be essentially embodied in form of a software product. Alternatively, a part that contributes to the related technology may be embodied in form of the software product. Alternatively, all or part of the technical solution may be embodied in form of the software product. The computer software product is stored in the non-transitory computer-readable storage medium including several instructions to enable a computer device (such as a personal computer, a server, or a network device, etc.) or a processor to execute all or part of operations of the methods in some embodiments of the present disclosure. The computer-readable storage medium includes various kinds of medium storing program codes such as a U disk, a mobile hard disk, a Read Only Memory (ROM), a Random Access Memory (RAM), a magnetic disk or an optical disk.

Some embodiments of the present disclosure discloses an image processing method, and the method includes: acquiring an exposure duration of a current video frame and at least one motion component corresponding to at least one direction within the exposure duration; performing a first noise reduction operation on the current video frame in a two-dimensional space domain in response to a first motion component of the at least one motion component being greater than a preset motion component threshold; and performing a second noise reduction operation on the current video frame in a three-dimensional space domain in response to the at least one motion component being less than the preset motion component threshold.

In some embodiments, the performing a noise reduction operation on the current video frame in a two-dimensional space domain in response to a first motion component of the at least one motion component being greater than a preset motion component threshold, includes: acquiring at least one motion radian corresponding to the at least one direction in response to the first motion component being greater than the preset motion component threshold; and performing the first noise reduction operation on the current video frame in the two-dimensional space domain in response to a first motion radian of the at least one motion radian being greater than a preset radian threshold.

In some embodiments, the acquiring at least one motion component corresponding to at least one direction within the exposure duration, includes: dividing the exposure duration into a set of time samples; acquiring at least one set of angular-velocity-component samples in at least one dimension during the set of time samples, wherein each of the at least one dimension corresponds to one of the at least one set of angular-velocity-component samples during the set of time samples; determining an angular velocity component in the at least one dimension within the exposure duration based on the at least one set of angular-velocity-component samples; and determining the angular velocity component in the at least one dimension as the at least one motion component corresponding to the at least one direction.

In some embodiments, the method further includes: prohibiting the current video frame from being fused with an adjacent historical video frame and an adjacent next video frame in response to satisfying at least one following condition: the at least one motion component being greater than the preset motion component threshold; and the at least one motion radian being greater than the preset radian threshold.

In some embodiments, the method further includes: performing the second noise reduction operation on the current video frame by performing a multi-frame alignment on the current video frame with an adjacent historical video frame and an adjacent next video frame in response to satisfying at least one following condition: the first motion component being less than the preset motion component threshold; and the first motion radian being less than the preset radian threshold.

In some embodiments, the performing a second noise reduction operation on the current video frame in a three-dimensional space domain in response to the at least one motion component being less than the preset motion component threshold further includes: performing the second noise reduction operation on the current video frame by aligning the current video frame with an adjacent historical video frame and an adjacent next video frame in response to all of the at least one motion component being less than the preset motion component threshold.

In some embodiments, the at least one motion component includes an angular velocity component and an acceleration component.

In some embodiments, the method further includes: in response to the at least one motion component including the angular velocity component in at least one dimension, determining a motion amplitude within the exposure duration based on an integral of an absolute value of the angular velocity component.

In some embodiments, the acquiring an exposure duration of a current video frame and at least one motion component corresponding to at least one direction within the exposure duration, includes: synchronizing the exposure duration of the current video frame and angular velocity data in first, second, and third directions within the exposure duration, wherein the first direction is substantially perpendicular to the second direction and the third direction, and the second direction is substantially perpendicular to the third direction; and acquiring motion velocity values in the first, second, and third directions according to the angular velocity data in the first, second, and third directions within the exposure duration.

In some embodiments, the performing a first noise reduction operation on the current video frame in a two-dimensional space domain in response to a first motion component of the at least one motion component being greater than a preset motion component threshold, includes: acquiring motion angles in the first, second, and third directions in response to at least one of the motion velocity values among the motion velocity values in the first, second, and third directions being greater than a preset motion velocity value threshold; and performing the first noise reduction operation on the current video frame in the two-dimensional space domain in response to at least one of the motion angles in the first, second, and third directions being greater than a preset motion angle threshold.

The image processing apparatus according to some embodiments of the present disclosure may be configured to acquire the exposure duration of the current video frame and the at least one motion component corresponding to the at least one direction within the exposure duration. In response to the first motion component of the at least one motion component being greater than the preset motion component, the image processing apparatus is configured to perform the first noise reduction operation on the current video frame in the two-dimensional space domain. In response to the at least one motion component being less than the preset motion component threshold, the image processing apparatus is configured to perform the multi-frame noise reduction operation on the current video frame in the three-dimensional space domain. It can be seen that, in some embodiment of the present disclosure, when the image processing apparatus is performing the noise reduction on the current video frame, the image processing apparatus may first acquire the at least one motion component in the at least one direction of the image processing apparatus within the exposure duration, and then determine the motion value of the image processing apparatus based on the at least one motion component within the exposure duration. In response to the at least one motion component of the image processing apparatus within the exposure duration being greater than the preset motion component threshold, the image processing apparatus directly performs the first noise reduction operation on the current video frame in the two-dimensional space domain to reduce the operations of the processing of the alignment accuracy of multiple frames, thereby shortening the time of an image processing, and improving the speed of the image processing.

Some embodiments of the present disclosure further disclose an image processing apparatus and the image processing apparatus includes: a processor, a memory storing instructions executable by the processor, a communication interface, and a bus configured to connect the processor, the memory, and the communication interface, wherein when the instructions are executed, the processor performs the above-mentioned image processing methods.

Some embodiments of the present disclosure provide a non-transitory computer-readable storage medium storing a program, and the program is executed by the processor to implement the above-mentioned image processing methods.

Specifically, in some embodiments, the program instructions corresponding to the image processing method may be stored in a non-transitory computer-readable storage medium such as an optical disk, a hard disk, a USB flash drives, etc. In response to the program instructions corresponding to the image processing method stored in the non-transitory computer-readable storage medium being read or executed by an electronic device, the image processing methods described above may be implemented.

Those skilled in the art should understand that some embodiments of the present disclosure may provide a method, a system, or a computer program product. Therefore, some embodiments of the present disclosure may be in form of hardware embodiments, software embodiments, or some embodiments combining software with hardware. Moreover, some embodiments of the present disclosure may be in form of computer program products implemented on one or more computer-usable storage media (including but not limited to a disk storage, an optical storage, etc.) storing computer-usable program codes.

The present disclosure is described with reference to schematic flowcharts and/or block diagrams for implementing operations of methods, equipment (systems), and computer program products according to some embodiments of the present disclosure. It should be understood that each operation and/or block in the schematic flowcharts and/or block diagrams and a combination of the operations and/or blocks in the schematic flowcharts and/or block diagrams may be implemented by computer program instructions. The computer program instructions may be provided to the processor of a general-purpose computer, a special-purpose computer, an embedded processor, or other programmable data processing devices to generate a machine, so that the instructions executed by the processor of the computer or other programmable data processing devices are configured to generate an apparatus for implementing specified functions in one or more operations in the schematic flowcharts and/or one or more blocks in the block diagrams.

The computer program instructions may also be stored in a computer-readable memory that may direct a computer or other programmable data processing devices to work in a specific manner, so that the instructions stored in the computer-readable memory produce a product including an instruction device. The instruction device implements the specified functions in one or more processes in the schematic flowcharts and/or one or more blocks in the block diagrams.

The computer program instructions may also be loaded on a computer or other programmable data processing devices, so that a series of operation blocks are executed on the computer or the other programmable equipment to produce computer-implemented operations. In this way, the instructions executed on the computer or other programmable equipment may implement specified functions in one or more processes in the schematic flowcharts and/or one or more blocks in the block diagrams.

The foregoing description are only some embodiments of the present disclosure, and are not used to limit the protection scope of the present disclosure.

INDUSTRIAL APPLICABILITY

The image processing apparatus is provided in some embodiments of the present disclosure. When the image processing apparatus is performing the noise reduction on the current video frame, the image processing apparatus first acquires the at least one motion component in at least one direction of the image processing apparatus within the exposure duration, and then determines the motion amplitude of the image processing apparatus based on the at least one motion component within the exposure duration. In response to the at least one motion component of the image processing apparatus within the exposure duration being greater than the preset motion component threshold, the image processing apparatus directly performs the first noise reduction operation on the current video frame in the two-dimensional space domain to reduce the operations of the processing of the alignment accuracy of multiple frames, thereby shortening the time duration of the image processing, and improving the speed of the image processing.

What is claimed is:

1. An image processing method, comprising:
acquiring an exposure duration of a current video frame and at least one motion component of an image processing apparatus corresponding to at least one direction within the exposure duration of the current video frame;
performing a first noise reduction operation on the current video frame in a two-dimensional space domain in response to a first motion component of the at least one motion component being greater than a preset motion component threshold; and
performing a second noise reduction operation on the current video frame in a three-dimensional space domain in response to the at least one motion component being less than the preset motion component threshold.

2. The image processing method of claim 1, wherein performing the first noise reduction operation on the current video frame in the two-dimensional space domain in response to the first motion component of the at least one motion component being greater than the preset motion component threshold, comprises:
acquiring at least one motion radian corresponding to the at least one direction in response to the first motion component being greater than the preset motion component threshold; and
performing the first noise reduction operation on the current video frame in the two-dimensional space domain in response to a first motion radian of the at least one motion radian being greater than a preset radian threshold.

3. The image processing method of claim 2, further comprising:
prohibiting the current video frame from being fused with an adjacent historical video frame and an adjacent next video frame in response to satisfying at least one of the following conditions:
the at least one motion component being greater than the preset motion component threshold; and
the at least one motion radian being greater than the preset radian threshold.

4. The image processing method of claim 2, further comprising:
performing the second noise reduction operation on the current video frame by performing a multi-frame alignment on the current video frame with an adjacent historical video frame and an adjacent next video frame in response to satisfying at least one of the following conditions:
the first motion component being less than the preset motion component threshold; and
the first motion radian being less than the preset radian threshold.

5. The image processing method of claim 1, wherein acquiring at least one motion component corresponding to at least one direction within the exposure duration, comprises:
dividing the exposure duration into a set of time samples;
acquiring at least one set of angular-velocity-component samples in at least one dimension during the set of time samples, wherein each of the at least one dimension corresponds to one of the at least one set of angular-velocity-component samples during the set of time samples;
determining an angular velocity component in the at least one dimension within the exposure duration based on the at least one set of angular-velocity-component samples; and
determining the angular velocity component in the at least one dimension as the at least one motion component corresponding to the at least one direction.

6. The image processing method of claim 1, wherein performing the second noise reduction operation on the current video frame in the three-dimensional space domain in response to the at least one motion component being less than the preset motion component threshold further comprises:
performing the second noise reduction operation on the current video frame by aligning the current video frame with an adjacent historical video frame and an adjacent next video frame in response to all of the at least one motion component being less than the preset motion component threshold.

7. The image processing method of claim 1, wherein the at least one motion component comprises an angular velocity component and an acceleration component.

8. The image processing method of claim 7, further comprising:
in response to the at least one motion component comprising the angular velocity component in at least one dimension, determining a motion amplitude within the exposure duration based on an integral of an absolute value of the angular velocity component.

9. The image processing method of claim 1, wherein acquiring the exposure duration of the current video frame and at least one motion component corresponding to at least one direction within the exposure duration, comprises:
synchronizing the exposure duration of the current video frame and angular velocity data in first, second, and third directions within the exposure duration, wherein the first direction is substantially perpendicular to the second direction and the third direction, and the second direction is substantially perpendicular to the third direction; and
acquiring motion velocity values in the first, second, and third directions according to the angular velocity data in the first, second, and third directions within the exposure duration.

10. The image processing method of claim 9, wherein performing the first noise reduction operation on the current video frame in the two-dimensional space domain in response to the first motion component of the at least one motion component being greater than the preset motion component threshold, comprises:
acquiring motion angles in the first, second, and third directions in response to at least one of the motion velocity values among the motion velocity values in the first, second, and third directions being greater than a preset motion velocity value threshold; and
performing the first noise reduction operation on the current video frame in the two-dimensional space domain in response to at least one of the motion angles in the first, second, and third directions being greater than a preset motion angle threshold.

11. An image processing apparatus, comprising:

a processor, a memory storing instructions executable by the processor, a communication interface, and a bus configured to connect the processor, the memory, and the communication interface, wherein when the instructions are executed, the processor performs an image processing method, the method comprising:

acquiring an exposure duration of a current video frame and at least one motion component of the image processing apparatus corresponding to at least one direction within the exposure duration of the current video frame;

performing a first noise reduction operation on the current video frame in a two-dimensional space domain in response to a first motion component of the at least one motion component being greater than a preset motion component threshold; and performing a second noise reduction operation on the current video frame in a three-dimensional space domain in response to the at least one motion component being less than the preset motion component threshold.

12. The image processing apparatus of claim 11, wherein performing the first noise reduction operation on the current video frame in the two-dimensional space domain in response to the first motion component of the at least one motion component being greater than a preset motion component threshold, comprises:

acquiring at least one motion radian corresponding to the at least one direction in response to the first motion component being greater than the preset motion component threshold; and performing the first noise reduction operation on the current video frame in the two-dimensional space domain in response to a first motion radian of the at least one motion radian being greater than a preset radian threshold.

13. The image processing apparatus of claim 12, wherein the method further comprises:

prohibiting the current video frame from being fused with an adjacent historical video frame and an adjacent next video frame in response to satisfying at least one of the following conditions:

the at least one motion component being greater than the preset motion component threshold; and the at least one motion radian being greater than the preset radian threshold.

14. The image processing apparatus of claim 12, wherein the method further comprises:

performing the second noise reduction operation on the current video frame by performing a multi-frame alignment on the current video frame with an adjacent historical video frame and an adjacent next video frame in response to satisfying at least one of the following conditions:

the first motion component being less than the preset motion component threshold; and the first motion radian being less than the preset radian threshold.

15. The image processing apparatus of claim 11, wherein acquiring at least one motion component corresponding to at least one direction within the exposure duration, comprises:

dividing the exposure duration into a set of time samples;

acquiring at least one set of angular-velocity-component samples in at least one dimension during the set of time samples, wherein each of the at least one dimension corresponds to one of the at least one set of angular-velocity-component samples during the set of time samples;

determining an angular velocity component in the at least one dimension within the exposure duration based on the at least one set of angular-velocity-component samples; and determining the angular velocity component in the at least one dimension as the at least one motion component corresponding to the at least one direction.

16. A non-transitory computer-readable storage medium, storing a program applied to an image processing apparatus, wherein the program is executed by a processor to implement an image processing method, the method comprising:

acquiring an exposure duration of a current video frame and at least one motion component of the image processing apparatus corresponding to at least one direction within the exposure duration of the current video frame;

performing a first noise reduction operation on the current video frame in a two-dimensional space domain in response to a first motion component of the at least one motion component being greater than a preset motion component threshold; and performing a second noise reduction operation on the current video frame in a three-dimensional space domain in response to the at least one motion component being less than the preset motion component threshold.

17. The non-transitory computer-readable storage medium of claim 16, wherein performing the first noise reduction operation on the current video frame the two-dimensional space domain in response to the first motion component of the at least one motion component being greater than the preset motion component threshold, comprises:

acquiring at least one motion radian corresponding to the at least one direction in response to the first motion component being greater than the preset motion component threshold; and performing the first noise reduction operation on the current video frame in the two-dimensional space domain in response to a first motion radian of the at least one motion radian being greater than a preset radian threshold.

18. The non-transitory computer-readable storage medium of claim 17, wherein the method further comprises:

prohibiting the current video frame from being fused with an adjacent historical video frame and an adjacent next video frame in response to satisfying at least one of the following conditions:

the at least one motion component being greater than the preset motion component threshold; and the at least one motion radian being greater than the preset radian threshold.

19. The non-transitory computer-readable storage medium of claim 17, wherein the method further comprises:

performing the second noise reduction operation on the current video frame by performing a multi-frame alignment on the current video frame with an adjacent historical video frame and an adjacent next video frame in response to satisfying at least one of the following conditions:
  the first motion component is less than the preset motion component threshold; and
  the first motion radian is less than the preset radian threshold.

20. The non-transitory computer-readable storage medium of claim 16, wherein acquiring at least one motion component corresponding to at least one direction within the exposure duration, comprises:
  dividing the exposure duration into a set of time samples;
  acquiring at least one set of angular-velocity-component samples in at least one dimension during the set of time samples, wherein each of the at least one dimension corresponds to one of the at least one set of angular-velocity-component samples during the set of time samples;
  determining an angular velocity component in the at least one dimension within the exposure duration based on the at least one set of angular-velocity-component samples; and
  determining the angular velocity component in the at least one dimension as the at least one motion component corresponding to the at least one direction.

* * * * *